Nov. 8, 1955     H. E. ALLDERDICE     2,722,779
POT FOR GROWING PLANTS UNDER WATER CULTURE
Filed Sept. 9, 1952
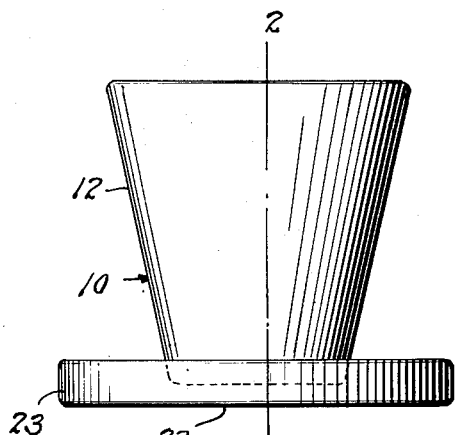
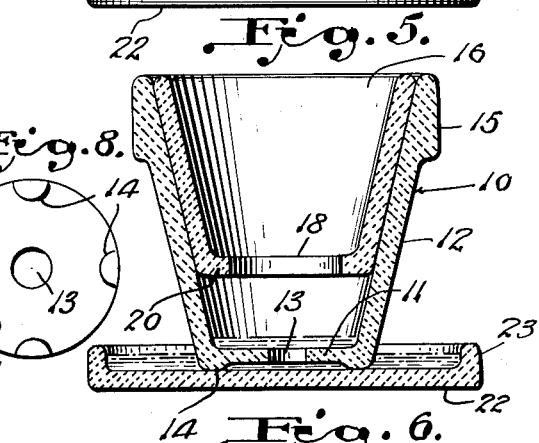
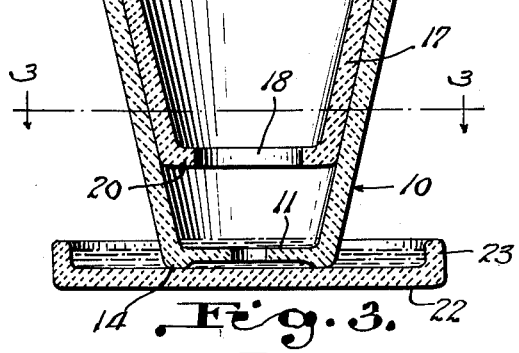
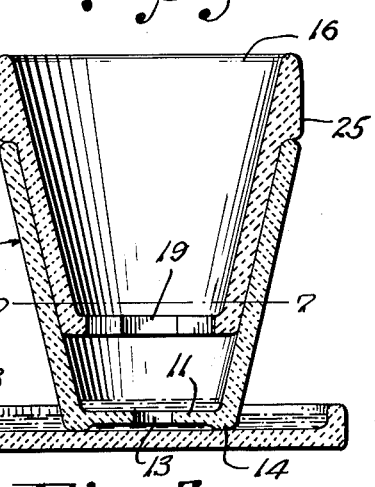
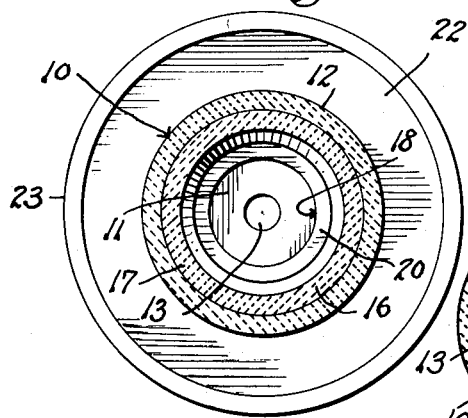
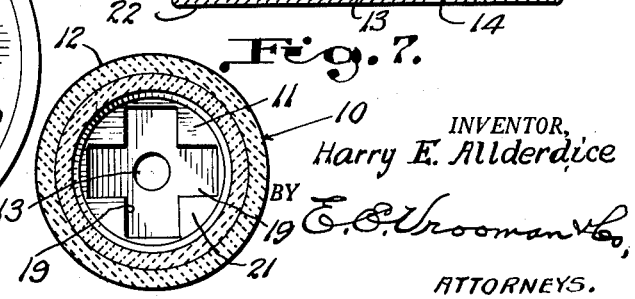
INVENTOR,
Harry E. Allderdice
BY
E. E. Vrooman & Co.,
ATTORNEYS.

United States Patent Office 2,722,779
Patented Nov. 8, 1955

2,722,779
POT FOR GROWING PLANTS UNDER WATER CULTURE

Harry E. Allderdice, Ceres, Calif.

Application September 9, 1952, Serial No. 308,627

1 Claim. (Cl. 47—38)

This invention relates to flower pots and has special reference to a self-watering flower pot.

One important object of the invention is to provide an improved form of flower pot wherein the earth in the pot will be spaced above a water-holding chamber attached to receive the roots of the plant.

Second important object of the invention is to provide an improved pot of this class wherein free admission of plant roots to the water-holding chamber will be obtained.

A third important object of the invention is to provide means, in a device of this kind, whereby a quantity of water may be fed continually from the outside of the pot to the moisture-holding chamber.

A fourth important object of the invention is to provide a novel form of pot wherein the earth-holding element of the pot may be removed at will, so that any earth that has fallen into the water-holding chamber may be cleaned out of this chamber.

With the above and other objects in view, as will be hereinafter apparent, the invention consists in general of certain novel details of construction and combinations of parts hereinafter fully described, illustrated in the accompanying drawings and particularly claimed.

In the accompanying drawings like characters of reference indicate like parts in the several views and:

Fig. 1 is a side elevation of an improved flower pot constructed in accordance with this invention.

Fig. 2 is a section on the line 2—2 of the Fig. 1.

Fig. 3 is a section on the line 3—3 of Fig. 2.

Fig. 4 is a side elevation of a modified form of this invention.

Fig. 5 is a vertical diametric section of the form of the invention shown in Fig. 4.

Fig. 6 is a section similar to Fig. 5, but showing a further modification of the invention.

Fig. 7 is a detailed section of the rim 7—7 of Fig. 6.

Fig. 8 is a soffit view showing the bottom of the outer pot element of this invention.

In the construction of this invention there is provided an outer member 10 of inverted frusto-conical form having a bottom 11 and a side wall 12. In the center of the bottom 11 is an opening 13 of sufficient size to freely admit water. Spaced around the periphery of the bottom of the member 10 are bosses 14, serving to hold the bottom 11 raised above any flat surface on which the pot may be placed.

In the modifications of the invention shown in Fig. 5 the member 10 is provided with a thickened rim 15.

Nested within the upper part of the member 10 is an inner member 16 having a side wall 17 and a bottom provided, in the form shown in Figs. 1 to 5, with a centrally disposed opening 18, this opening in modified form being shown at 19 in Fig. 6.

This opening is of sufficient size to freely pass the roots of a plant grown in the inner member but, however, a sufficient rim 20 is left in the first form and projections 21 are left in the form shown in Figs. 6 and 7 so that any earth held in inner member will be supported thereby and, when properly packed, will not fall into the chamber formed beneath the bottom of the inner member.

In all forms of the invention there is provided a saucer 22 having an upstanding rim 23 of sufficient height so that the horizontal plane of the upper edge of this rim will lie well above the inner surface of the bottom 11. By this means water placed in the saucer will rise into the moisture chamber and be held in the bottom of this moisture chamber.

In the form of the invention shown in Fig. 6 the inner member is provided with a rim 25 which rests on the top edge of the outer member when the inner member is nested therein.

What is claimed is:

In a self-watering flower pot, an inverted frusto-conical outer member having a bottom provided with a water-admitting opening, and an inverted frusto-conical inner member fitted closely in the outer member and having a bottom spaced above the bottom of the outer member to provide a root-receiving chamber, the bottom of the inner member having an opening therein, the opening in the bottom of the outer member being relatively small and the opening in the inner member being relatively large to form a free root passage into said chamber to provide a root expansion chamber on a controlled fluid medium in said chamber, said relatively large opening being of sufficient extent to provide a normally fluid-filled space within which said roots may expand despite the absence of soil to permit maximum growth of said plants, the periphery of the opening being spaced from the inner surface of the inner member to provide earth supporting means, in combination with a saucer in which the outer member rests, said saucer having a rim extending upwardly to a plane above the plane of the inner surface of the bottom of the outer member, and bosses formed integrally with and projecting downwardly from the bottom of the outer member and supporting the said bottom of the outer member in spaced relation above the bottom of the saucer to provide space for root expansion.

References Cited in the file of this patent
UNITED STATES PATENTS

| | | |
|---|---|---|
| 55,482 | Fuller | Jan. 12, 1866 |
| 802,460 | Marshall | Oct. 24, 1905 |
| 1,251,552 | Marks | Jan. 1, 1918 |
| 1,557,712 | Little | Oct. 20, 1925 |
| 1,561,824 | Boehm | Nov. 17, 1925 |
| 1,710,878 | Kelso | Apr. 30, 1929 |
| 2,135,998 | Beyer | Nov. 8, 1938 |